United States Patent
Kondo et al.

(10) Patent No.: US 6,181,632 B1
(45) Date of Patent: Jan. 30, 2001

(54) MULTIPLE MEMORY BANK DEVICE AND METHOD FOR IMAGE PROCESSING

(75) Inventors: Tetsujiro Kondo, Tokyo; Akihiro Okumura; Takayoshi Fujiwara, both of Kanagawa, all of (JP)

(73) Assignee: Sony Corporation, Tokyo (JP)

( * ) Notice: Under 35 U.S.C. 154(b), the term of this patent shall be extended for 0 days.

(21) Appl. No.: 09/394,439

(22) Filed: Sep. 9, 1999

(30) Foreign Application Priority Data

Sep. 11, 1998 (JP) .................................. 10-257877

(51) Int. Cl.⁷ ................................................ G11C 8/00
(52) U.S. Cl. ............................ 365/230.03; 365/230.04; 345/516; 345/517
(58) Field of Search .................. 365/230.03, 189.04, 365/230.08, 230.04; 345/516, 517, 518

(56) References Cited

U.S. PATENT DOCUMENTS 5,396,592  *  3/1995  Fujimoto ............................ 395/162
5,977,996  *  11/1999  Kondo ................................. 345/516
5,986,635  *  11/1999  Naka et al. ......................... 345/127

\* cited by examiner

*Primary Examiner*—Richard Elms
*Assistant Examiner*—Hien Nguyen
(74) *Attorney, Agent, or Firm*—Frommer, Lawrence & Haug, LLP; William S. Frommer

(57) ABSTRACT

A memory device for storing data of the present invention comprises memory means having a plurality of memory banks, write selecting means for selecting 1 memory bank from among the plurality of memory banks and for writing the data therein, read out selecting means for selecting other two or more memory banks from among the plurality of memory banks and for reading out the data therefrom, and data selecting means for selecting the data generated from the read out selecting means. An image data consisting of a desired number of pixels in the horizontal direction and vertical direction respectively is obtained without using a line memory for temporarily storing the image data of required number of lines.

21 Claims, 11 Drawing Sheets

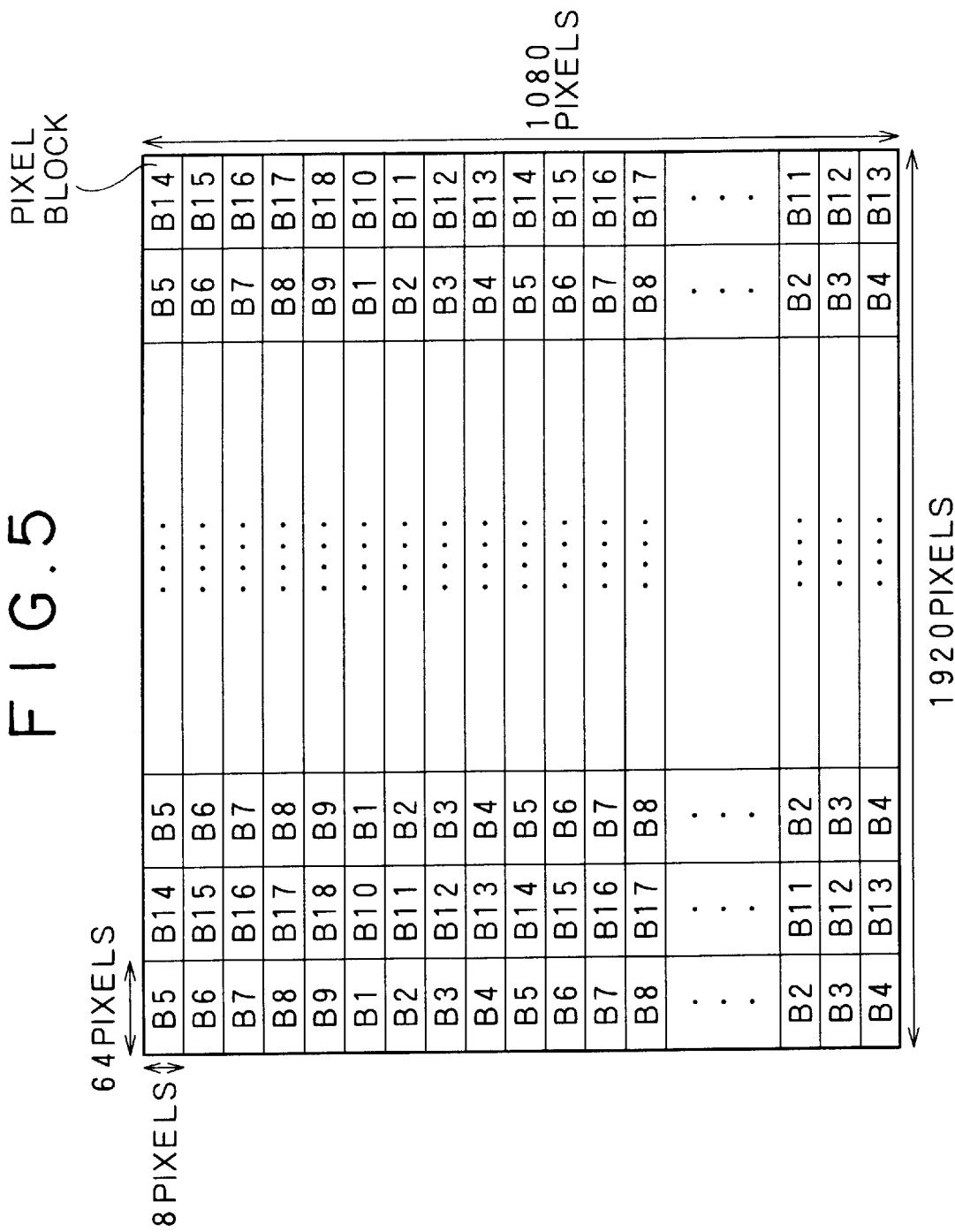

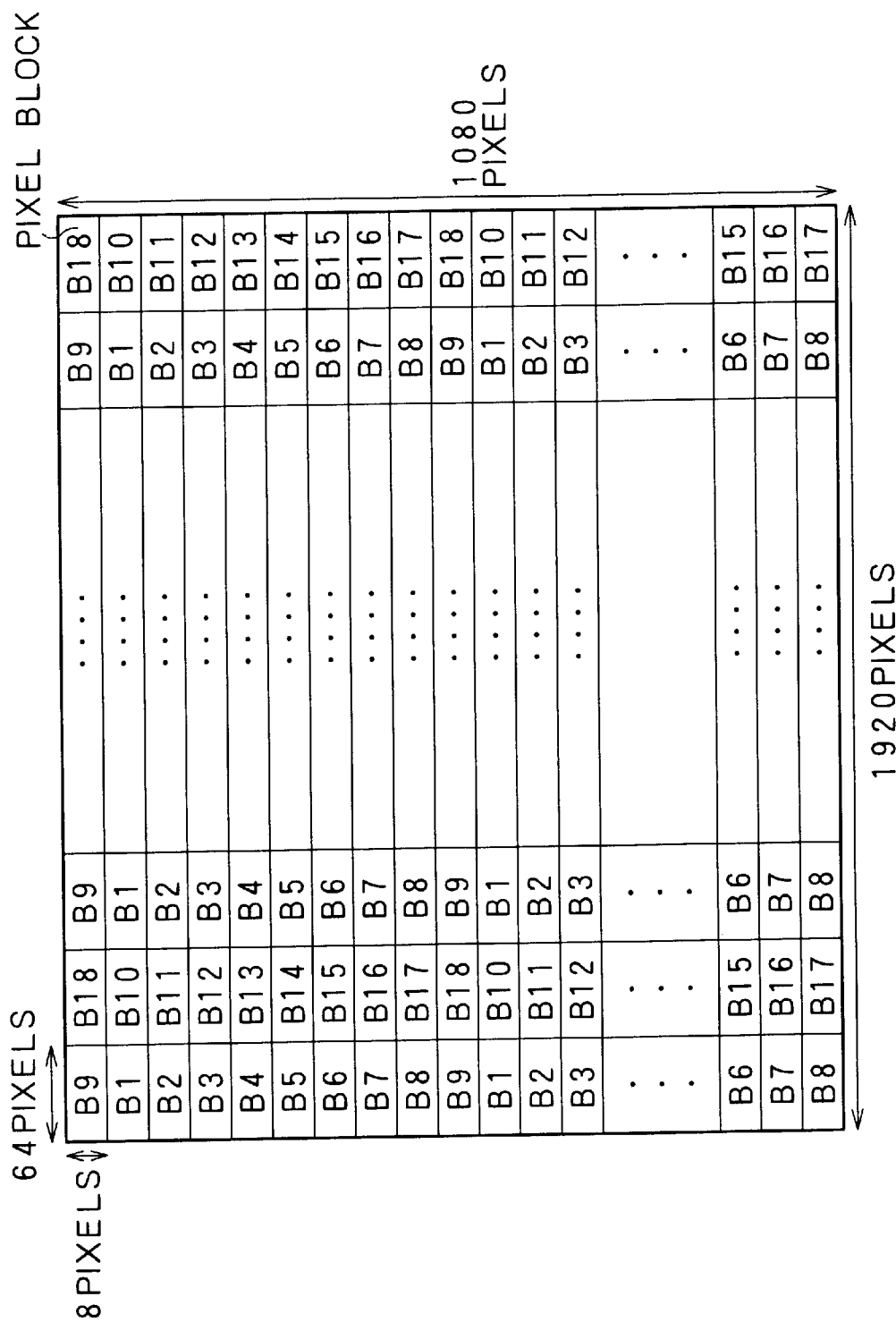

IMAGE SIZE: VERTICAL a PIXELS × HORIZONTAL b PIXELS

MEMORY CAPACITY OF 1 BANK: c PIXELS

NUMBER OF PIXELS OF 1 WL OF BANK: d PIXELS

NUMBER OF OUTPUT PIXELS OF BANK: e PIXELS

TAP PIXEL AREA: VERTICAL f PIXELS × HORIZONTAL g PIXELS

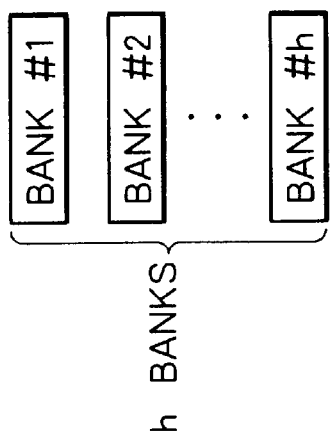
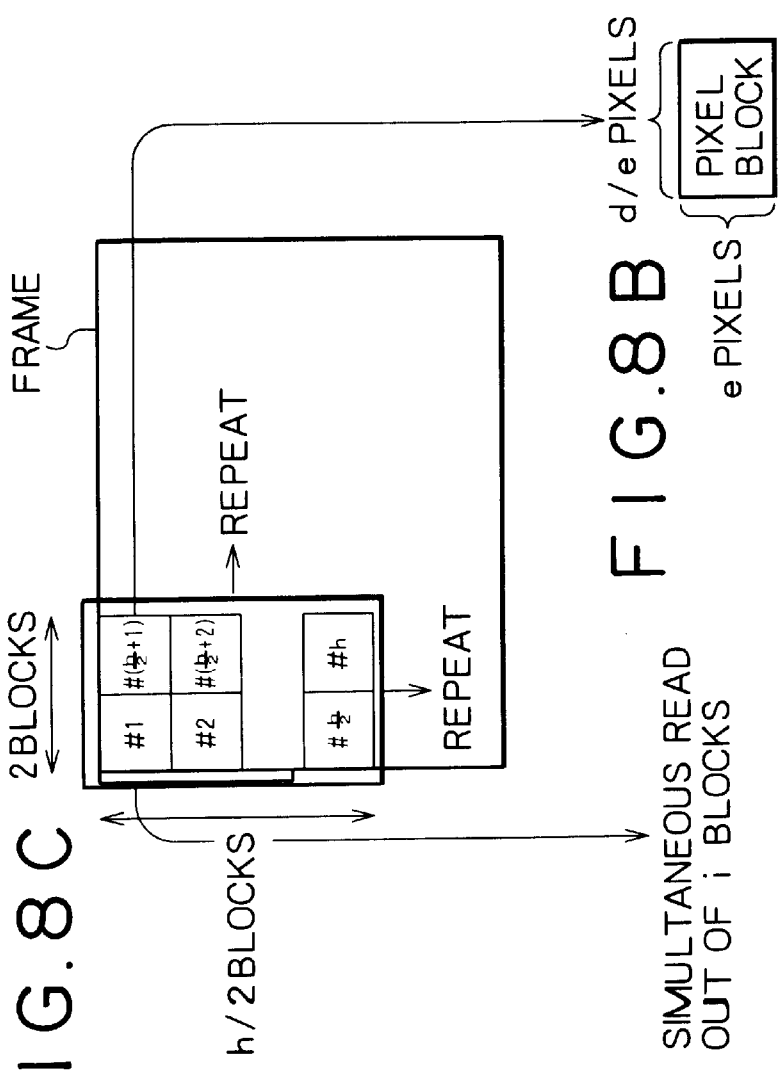

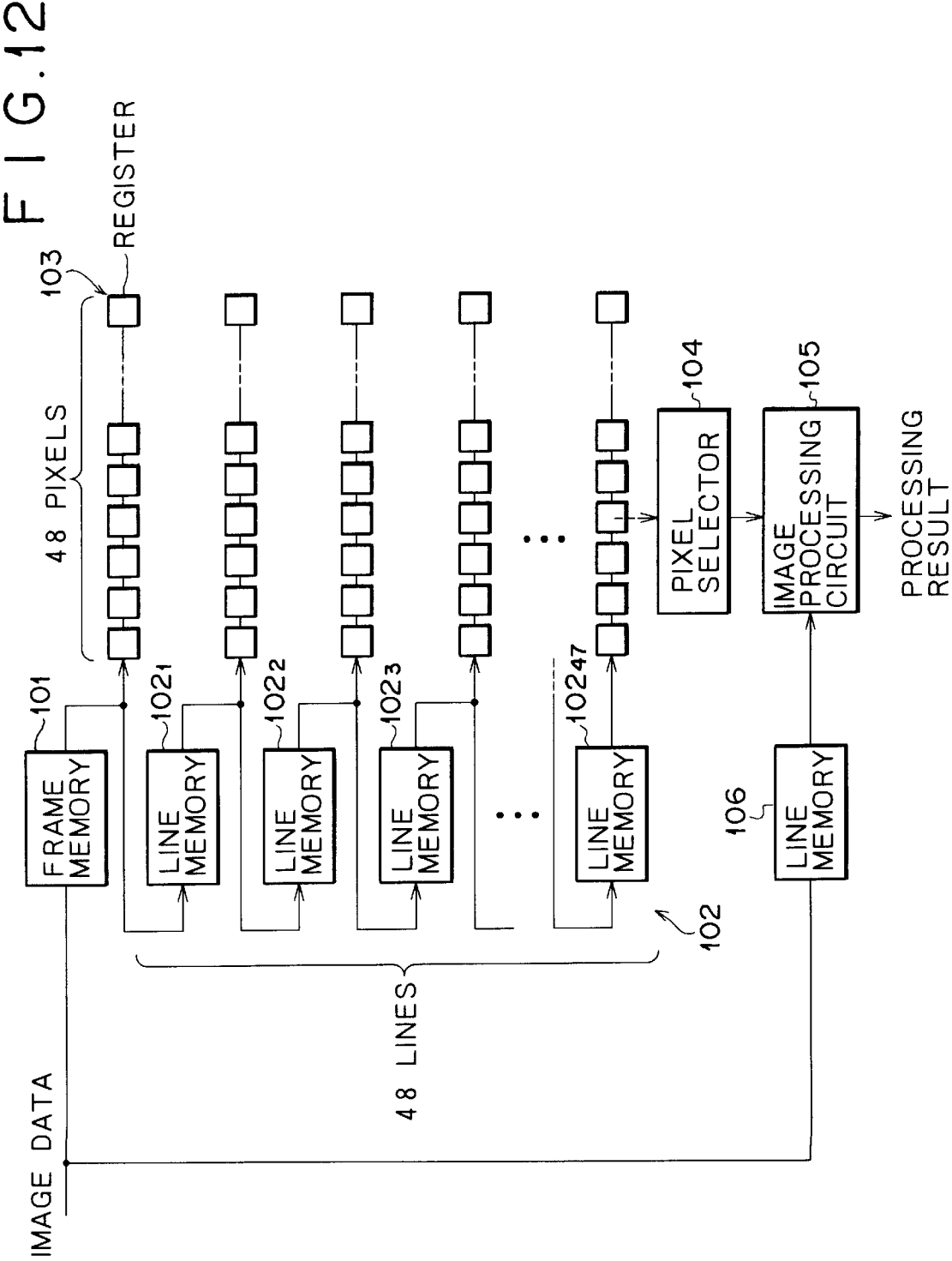

MULTIPLE MEMORY BANK DEVICE AND METHOD FOR IMAGE PROCESSING

BACKGROUND OF THE INVENTION

1. Field of the Invention

This invention relates to a memory device, and a writing method and a reading method, and more particularly relates to a memory device for, for example, obtaining an image data consisting of a desired number of pixels in the horizontal direction and vertical direction respectively without using a line memory for temporarily storing the image data of required number of lines, and a writing method and reading method of the memory device.

2. Description of Related Art

In image processing such as motion detection, for example, in MPEG (Moving Picture Experts Group), which is a standard for coding/decoding of image, a current frame is compared with a temporally precedent (past) or temporally subsequent (future) frame for processing.

FIG. 12 shows such an exemplary structure of a conventional image processing device. In the image processing device, when a pixel of the current frame is addressed, prescribed processing such as motion detection is performed by use of the pixel data in an area of 48 pixels×48 lines having the pixel of the precedent frame corresponding to the addressed pixel of the current frame at the center. The area which is required to perform the prescribed processing of the addressed pixel (herein 48 pixels×48 lines) is referred to as necessary area hereinafter.

The pixel data which is a component of the digital image data which is a dynamic image is supplied successively to, for example, a frame memory 101 having a one frame memory capacity, and stored, for example, in the order of line scanning. The pixel data stored in the frame memory 101 is read out successively in the order of line scanning and supplied to a line memory unit 102.

The lime memory unit 102 comprises line memories of the number equal to the number of lines of the necessary area −1 namely 47 line memories $102_1$ to $102_{47}$ to acquire the pixel data loaded on the lines of the necessary area (herein, 48 lines), and the pixel data from the frame memory 101 is supplied to and stored in the line memory 102. The pixel data stored in the line memory 102 is shifted to the right every time when the pixel data is supplied successively. Addressing on a certain pixel data, when the addressed pixel data is supplied to the line memory $102_1$ and then one line pixel data is supplied, the addressed pixel data is sent out from the line memory $102_1$, and supplied to the next line memory $102_2$.

As in the line memory $102_1$, in the line memory $102_2$, the pixel data supplied from the line memory $102_2$ is supplied to the next line memory $102_3$ with one line delay. Similarly, in the following line memories $102_3$ to $102_{47}$, the pixel data is supplied to the next line memory with one line delay respectively.

The pixel data sent out from the frame memory 101 is supplied not only to the line memory unit 102 but also to a two-dimensional parallel array 103. The two-dimensional parallel array 103 consists of the same number of registers as the number of vertical and horizontal pixels which are components of a necessary area, which registers are arranged in the vertical and horizontal directions, in other words, 48×48 registers are arranged respectively in the vertical direction and the horizontal direction, and the pixel data sent out from the frame memory 101 is supplied to and stored in the register of the first row and first column of the two-dimensional parallel array 103. In the two-dimensional parallel array 103, the pixel data stored in the register of the first row first column is shifted to the next right register every time when the next pixel data is supplied successively, and at last the pixel data is deleted after the pixel data is stored in the 48-th column register (when the pixel data stored in the 47-th column register is shifted to the 48-th column register, the pixel data which has been stored in the 48-th column register is erased).

The pixel data sent out from the line memory $102_1$ is supplied not only to the next line memory $102_2$ but also to the two-dimensional parallel array 103. In the two-dimensional parallel array 103, the pixel data from the line memory $102_1$ is supplied to and stored in the register of the second row first column. The pixel data stored in the register of the second row first column is shifted to the next right register successively every time when the next pixel data is supplied from the line memory 102, and deleted after stored in the register of the 48-th column.

Respective pixel data sent out from the line memories $102_2$ to $102_{47}$ are supplied to the two-dimensional parallel array 103, and in the two-dimensional parallel array 103, the respective pixel data from the line memories $102_2$ to $102_{47}$ are supplied to and stored in the respective registers of the third row first column to the 48-th row first column. The respective pixel data stored in the registers of the third row first column to the 48-th row first column are shifted successively to the right registers every time when the next data are supplied from the line memories $102_2$ to $102_{47}$, and deleted after stored in the 48-th column registers.

On the other hand, the pixel data which is supplied to the frame memory 101 is supplied also to a line memory 106. In the line memory 106, the input pixel data is one line delayed and supplied to an image processing circuit 105.

In the image processing device shown in FIG. 12, the pixel data is read out from the frame memory 101 at the starting so that, at the time when the pixel data of the current frame a is supplied to the image processing circuit 105, the pixel data of 48 pixels×48 lines of pixels of precedent one frame corresponding to the pixel data of the current frame is stored in the 48×48 registers of the two-dimensional parallel array 103, therefore, when a certain pixel data is supplied to the image processing circuit 105, the pixel data in the necessary area for the pixel data is stored.

A pixel selector 104 selects the partial pixel data to be used in the image processing circuit 105 for processing of the pixel data supplied to the image processing circuit 105 from among the pixel data in the necessary area stored in the two-dimensional parallel array 103 as required, and supplies the selected pixel data to the image processing circuit 105.

The image processing circuit 105 performs the predetermined processing to detect the motion by use of the pixel data from the line memory 106 and the pixel data from the image selector 104, and sends out the processing result.

Because the respective pixel data of the current frame is processed by use of the pixel data of the precedent frame in the image processing device shown in FIG. 12, the respective pixel data of the next frame is processed by use of the pixel data of the current frame after the pixel data of the current frame has been processed. Accordingly the pixel data of the current frame is supplied to the frame memory 101 after the pixel data of the precedent frame is stored, it is required to store the pixel data of the current frame in the frame memory 101 to process the pixel data of the next frame.

However, because the pixel data of the precedent frame stored in the address where the pixel data of the current frame is stored is erased when the pixel data of the current frame is stored in the frame memory 101, the pixel data of the precedent frame can not be used to process the pixel data of the current frame unless any counter measure is applied.

To avoid such problem, the line memory 102 is provided in the image processing device shown in FIG. 12, and the real time processing of image is made possible by retaining the lines of the number equal to the number of lines of the necessary area −1 in the line memory unit 102.

However, in view of structuring the image processing device shown in FIG. 12 in one chip (LSI (Large Scale Integration)), it is required to provide the line memory unit 102, which is not necessary if real time processing is not performed, as the result a chip with large chip size is required. In other words, the number of lines in the necessary area is 48 in FIG. 12, it is therefore required to incorporate 47 (48−1) line memories in a chip to retain the pixel data of the lines in the necessary area.

The number of line memories which are incorporated in a chip is limited if the chip size is limited. Further, in some cases, the number of line memories which can be incorporated in a chip is limited due to the layout of the chip. In the case that the number of line memories which can be incorporated in a chip is limited, the necessary area is also limited, and as the result, for example, the so-called search range is also limited when the image processing device shown in FIG. 12 is applied to block matching for motion detection or motion compensation in MPEG.

Further, though the frame memory 101 which is capable of storing one frame pixel data, the additional line memories for storing the pixel data of lines of the number equal to the number of lines of the necessary area 31 1 are provided, and such additional incorporation is not preferable from the view point of power consumption because it may be excessive.

SUMMARY OF THE INVENTION

In the present invention, the pixel data comprising a desired number of pixels in the horizontal direction and the vertical direction can be obtained without using, for example, line memories for temporarily storing the image data of the required lines.

A memory device described in the present invention comprises memory means having a plurality of memory banks, write selecting means for selecting 1 memory bank from among the plurality of memory banks and for writing the data therein, read out selecting means for selecting other two or more memory banks from among the plurality of memory banks and for reading out the data therefrom, and data selecting means for selecting the data generated from the read out selecting means.

The write method described in the present invention is a method in which a write selecting means for writing the horizontal pixel data which is the component of the image data in the selected memory bank selects one memory bank from among the plurality of memory banks so that the pixel data is stored in the plurality of respective memory banks in a predetermined pixel block unit, and the memory bank stores the pixel data which is the component of the pixel block in a memory cell on one word line.

A read out method described in the present invention is a method in which two or more memory banks are selected from among a plurality of memory banks to read out the data, and the read out data is selected and sent out.

In the memory device described in the present invention, the memory means is provided with a plurality of memory banks. The write selecting means selects one memory bank from among the plurality of memory banks and writes the data therein. The read out selecting means selects other two or more memory banks from among the plurality of memory banks and reads out the data therefrom. The data selecting means selects the data supplied from the read out selecting means.

In the write method described in the present invention, the write selecting means for writing the horizontal pixel data which is the component of the image data selects one memory bank from among a plurality of memory banks so that the pixel data is stored in the plurality of respective memory banks in a predetermined pixel block unit, and the memory bank stores the pixel data which is the component of the pixel block on a memory cell on one word line.

In the read out method described in the present invention, two or more memory banks are selected from among the plurality of memory banks to read out the data, and the read out data is selected and sent out.

According to the memory device described in the present invention, 1 memory bank is selected from among a plurality of memory banks of the memory means, the data is written therein, other two or more banks are selected from among the plurality of memory banks, and the data is read out. The read out data is selected.

According to the writing method described in the present invention, 1 memory bank is selected from among a plurality of memory banks so that the pixel data is stored in said plurality of respective memory banks in a predetermined pixel block unit, and the pixel data which is the component of the pixel block is stored in the memory cell on 1 word line of the memory bank.

According to the reading out method described in the present invention, two or more memory banks are selected from among a plurality of memory banks so that the data is read out, and the read out data is selected.

Accordingly, for example, the image data supplied continuously in the horizontal direction namely in the order of line scanning is converted to the image data which is continuous in the vertical direction without using a line memory for temporarily storing the image data of the required number of lines, and the two-dimensional block comprising desired number of horizontal and vertical pixels is obtained.

The following prior patents which relate to the present invention have been applied by the applicant of the present invention.
(1) Japanese Patent Application No. H10-022172 (Corresponding to US application is now pending)
(2) Japanese Patent Application No. H10-032913 (Corresponding to US application is now pending)
(3) Japanese Patent Application No. H10-242773 (corresponding to US application is now pending)

BRIEF DESCRIPTION OF THE DRAWINGS

FIG. 5 is a diagram for describing a method for mapping of the pixel data on the memory 2.

FIG. 6 is a diagram for describing a method for mapping of the pixel data on the memory 2.

FIG. 8A to FIG. 8C are diagrams for describing a method for mapping of the image on each bank which is an component of the memory 2.

FIG. 12 is a block diagram for illustrating an exemplary structure of a conventional image processing device.

DETAILED DESCRIPTION OF THE PREFERRED EMBODIMENTS

Figure 1:
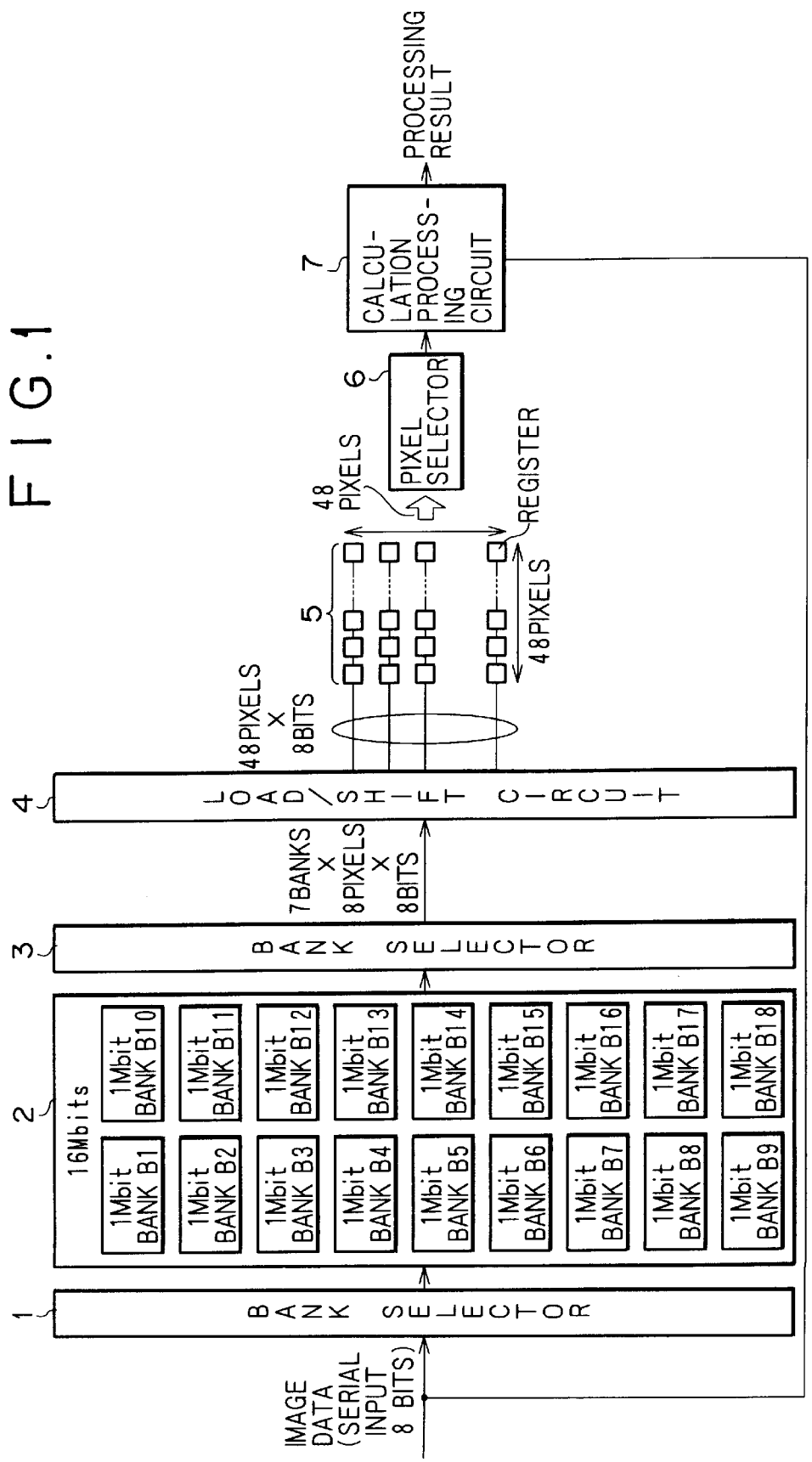
FIG. 1 is a block diagram for illustrating an exemplary structure of one embodiment of an image processing device to which the present invention is applied.

FIG. 1 shows an exemplary structure of one embodiment of an image processing device to which the present invention is applied.

In the image processing device, for example, an area of 48 pixels×48 lines is detected as the necessary area having the pixel of the immediately precedent frame corresponding to the addressed pixel of the current frame at the center, processing is performed by use of the pixel data in the necessary area.

For example, serial 8-bit data, namely the pixel data which is the component of the digital image data of a dynamic image, is supplied to a bank selector 1 (write selecting means) and processing circuit 7 in the order of line scanning. The image data is, for example, HD (High Density) image data consisting of 1920 horizontal pixels and 1080 vertical pixels.

The bank selector 1 selects one bank successively from among banks (memory banks) B1 to B18 which are components of a memory 2, and the horizontal pixel data which is the component of the HD image supplied thereto is written in the selected one bank.

The memory 2 (memory means) is provided with a memory capacity of, for example, 18M bits and provided with a bank switching function. The memory 2 has, for example, respective eighteen 1M-bit banks B1 to B18 (a plurality of memory banks). In the present embodiment, 1 frame HD image consists of 1920×1080 pixels, and one pixel data consists of 8 bits, then the capacity is 16588800 (=1920×1080×8) bits. On the other hand, because the capacity of the memory 2 is 18 M bits (=18874368) bits, the capacity of the memory 2 is about 2 M bit larger than that of 1 frame HD image.

In the image processing device shown in FIG. 1, similarly to the image processing device shown in FIG. 12, the pixel data of horizontal 48 pixels×vertical 48 pixels is detected as the necessary area. In this case, in the image processing device shown in FIG. 12, 47 line memories $102_1$ to $102_{47}$ is required for the line memory unit 102 as described hereinbefore. It is assumed that an HD image consisting of horizontal 1920 pixels×vertical 1080 pixels as described herein above is processed in the image processing device shown in FIG. 1 and FIG. 12, the capacity of one line memory in the line memory unit 102 should be 1920×8 bit (8 is the number of bits assigned to the pixel data), therefore for 47 line memories, the capacity should be 1920×8×47 bits namely about 800K bits. The memory capacity of the image processing device shown in FIG. 1 is about 2 M bits larger than the memory capacity for storing 1 frame HD image, and the memory capacity of the image processing device shown in FIG. 12 is about 800K bits larger than the memory capacity for storing 1 frame HD image. In other words, the image processing device shown in FIG. 1 has the excessive memory capacity of about 2.5 times that of the image processing device shown in FIG. 12 in addition to the memory capacity for 1 frame.

However, DRAM may be used as the banks B1 to B18 which are components of the memory 2 in the image processing device shown in FIG. 1 as described hereinafter. On the other hand, SRAM (Static RAM) is used generally for the line memories $102_1$ to $102_{47}$ of the image processing device shown in FIG. 12. In the case that a DRAM and an SRAM have the same capacity, it is known that the chip size of an SRAM is about 10 to 20 times larger than that of a DRAM. Therefore, though the excessive memory capacity of the image processing device shown in FIG. 1 is about 2.5 times larger than the excessive memory capacity of the image processing device shown in FIG. 12, the chip size increment of the image processing device shown in FIG. 1 due to the excessive memory capacity is about ¼ to ⅛ of the chip size increment of the image processing device shown in FIG. 12. As the result, the chip size of the image processing device shown in FIG. 1 can be miniaturized in comparison with the image processing device shown in FIG. 12. (the chip size increment due to the excessive memory capacity is reduced).

The bank selector 3 (read out selecting means) selects successively, for example, 7 banks from among the bank B1 to B18 which are components of the memory 2, and reads out the vertical pixel data which is the component of the HD image from the selected 7 banks. 64 bit data can be written in/read out from the respective banks B1 to B18 at a time. Accordingly, in the present invention 1 pixel data consists of 8 bits, 8-pixel (=64/8) pixel data can be therefore read out from the respective banks B1 to B18 at a time, and totally 56 pixel (=7×8) pixel data (7×8×8 bits data) is read out at a time.

The 56-pixel pixel data sent out from the bank selector 3 is supplied to a load/shift circuit 4. The load/shift circuit 4 (data selecting means) selects the pixel data having the same number of lines as that of the necessary area from among the 56-pixel pixel data sent out from the bank selector 3, that is, 48-pixel pixel data is selected, and supplied to a two dimensional parallel array 5.

The two-dimensional parallel array 5 comprises registers arranged in the same manner as pixels which constitute the necessary area similarly to the two-dimensional parallel array 103 shown in FIG. 12. In other words, the two-dimensional parallel array 5 comprises 48 registers respectively in the horizontal and vertical directions The two-dimensional parallel array 5 stores the 48 pixel data from the load/shift circuit 4 in the first row first column register to the 48-th row first column register respectively, and thereafter every time when new 48 pixel data is supplied from the load/shift circuit 4, the pixel data stored in the respective registers is shifted to the next right register.

A pixel selector 6 selects the pixel data used for processing the pixel data to be supplied to a processing circuit 7 from among the pixel data in the necessary area stored in the two-dimensional parallel array 5 similarly to the pixel sector 104 (?5) shown in FIG. 12, and supplies the selected pixel data to the processing circuit 7. The processing circuit 7 performs the prescribed processing by use of the pixel data supplied to the bank selector 1 and the pixel data supplied from the pixel selector 6, and generates the processing result.

Figure 2:
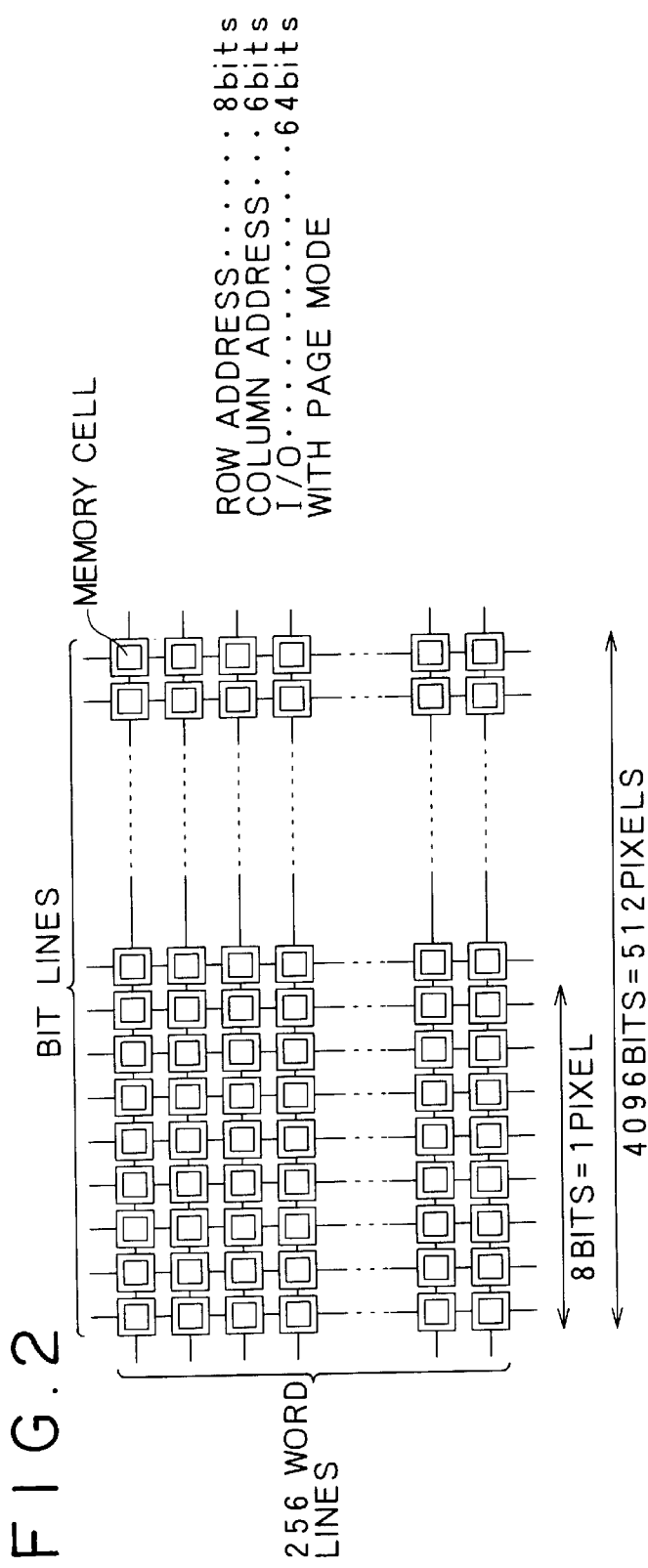
FIG. 2 is a diagram for illustrating an exemplary structure of bank B1 to bank B18 which are components of the memory 2 shown in FIG. 1.

Next, FIG. 2 shows an exemplary structure of banks B#i (i=1, 2, . . . , 18) which are components of the memory 2 shown in FIG. 1.

A bank B#i consists of, for example, 16K (kilo)×64 bits DRAM (Dynamic Random Access Memory), accordingly the data can be read/written (input output (I/O)) in 64 bit unit, in detail in the present invention, 8 (=64/8) pixel unit. Further, the row address and the column address of the bank B#i are indicated respectively with 8 bits or 6 bits, and provided with so-called page mode function.

The row address of the bank B#i is indicated with 8 bits, and therefore has 256 word lines. 4096 (=16K×64 bits/256) memory cells (indicated with double-lined square in FIG. 2) are provided on each word line. Because the pixel data consists of 8 bits as described herein above, a memory cell on 1 word line stores the pixel data of 512 (=4096/8) pixels.

Next, the operation of the image processing device shown in FIG. 1 is described.

The pixel data to be processed is supplied to the bank selector 1 and the processing circuit 7, for example, in the order of so-called line scanning, the bank selector 1 selects successively 1 bank from among the banks B1 to B18 which are components of the memory 2, and writes the horizontal pixel data which is the component of the HD image supplied thereto in the selected 1 bank.

In other words, the bank selector 1 selects a bank one by one successively from among banks B1 to B18 so that the pixel data which is the component of the HD image is stored in the respective banks B1 to B18 in the predetermined pixel block unit.

Figure 3:
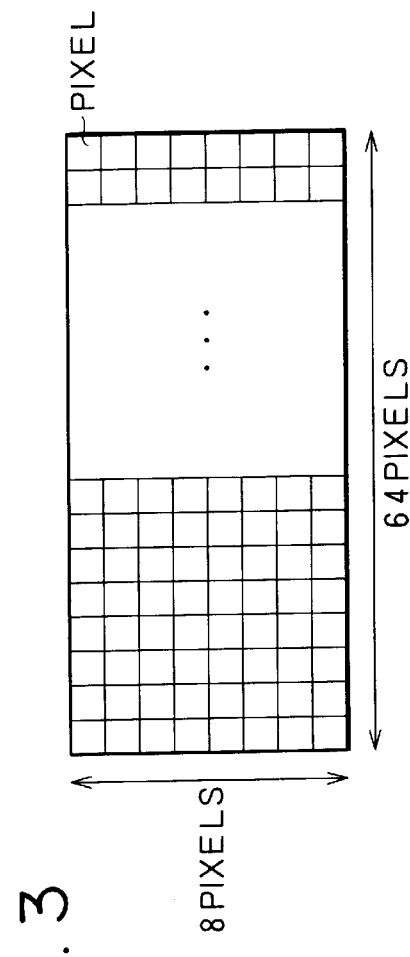
FIG. 3 is a diagram for illustrating an exemplary structure of a pixel block.

The pixel block consists of the same number of pixels as the number of pixels which can be stored in the memory cell on 1 word line of the bank B#i (in the present embodiment, 512 pixels as described with reference to FIG. 2) Further, the number of vertical (perpendicular) pixels of a pixel block is the same as the number of pixels which are read from/ written in the bank B#i at a time (8 pixels in the present embodiment as shown with reference to FIG. 2). Therefore, a pixel block consists of 512 pixels as shown in FIG. 3, and the number of vertical pixels is 8 pixels. The number of horizontal (lateral) pixels of a pixel block is 64 (=512/8) pixels.

The bank B#i selected by the bank selector 1 stores 512-pixel pixel data which constitute one pixel block in the memory cell on one word line. Further at that time, the pixel data is stored so that all the vertical pixels of a pixel block (FIG. 3), namely all the pixel data of 8 pixels arranged in the vertical direction, is read out at a time.

Further, the bank selector 1 selects a bank from among the plurality of banks B1 to B18 so that the adjacent pixel block of the HD image is stored in another bank. In detail, the bank selector 1 selects a bank from among the plurality of banks B1 to B18 so that, for example, pixel blocks adjacent in the horizontal direction in the HD image are stored alternately in two banks and the pixel blocks adjacent in the vertical direction in the HD image are stored periodically in 9 banks.

Figure 4:
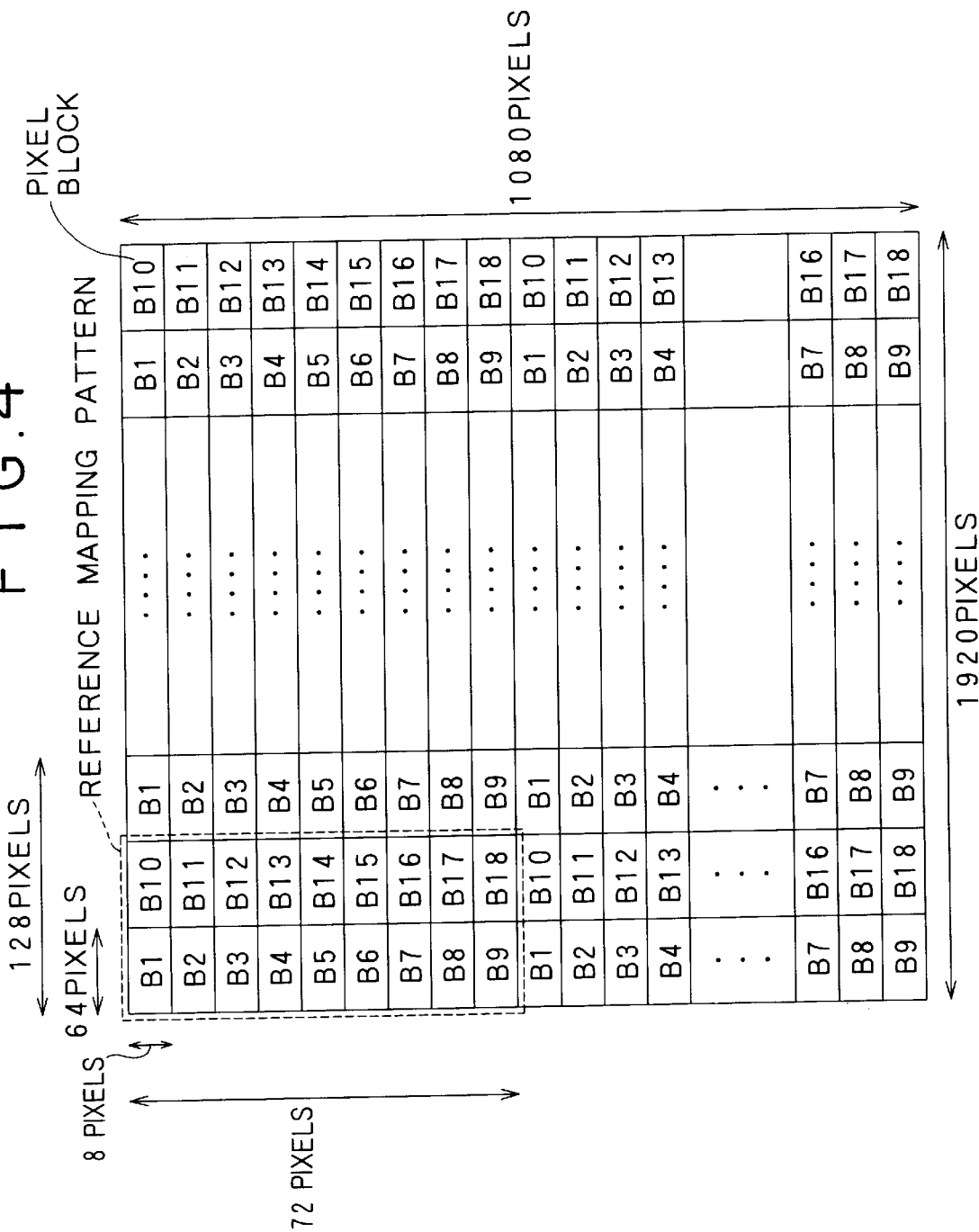
FIG. 4 is a diagram for describing a method for mapping of the pixel data on the memory 2.

As the result, the HD image consisting of horizontal 1920 pixels and vertical 1080 pixels is mapped, for example, in the respective banks B1 to B18 as shown in FIG. 4.

In detail, the first row first column pixel block positioned at the upper left corner of the HD image is stored in the bank B1, and the second row first column pixel block which is adjacent just under the first row first column pixel block is stored in the bank B2. Further, the third row first column pixel block which is adjacent just under the second row first column pixel block is stored in the bank B3, similarly in the following, the residual pixel blocks of the fourth row first column to the ninth row first column including pixels from the top pixel to the 72-nd pixel are stored respectively in banks B4 to B9.

The first row second column pixel block consisting of pixels of 65-th to 128-th from the left and pixels of first to eighth from the top, which is positioned right (?1, left?) adjacent to the first row first column pixel block of the HD image, is stored in the bank B10, the second row second column pixel block which is adjacent just under the first row second column pixel block is stored in the bank B11. Further, the third row second column pixel block which is adjacent just under the second row second column pixel block is stored in the bank B12, and similarly in the following, the residual pixel blocks of the fourth row second column to the ninth row second column including pixels from the top pixel to the 72-nd pixel are stored respectively in banks B13 to B18.

The first column 10-th row pixel block and following pixel blocks are stored synchronously in the banks B1 to B9 similarly to the pixel blocks of the first row first column to the ninth row first column, and the second column 10-th row pixel block and following pixel blocks are stored synchronously in the banks B10 to B18 similarly to the pixel blocks of the first row second column to the ninth row second column. Further, pixel blocks of the third column are stored in the banks B1 to B9 similarly to the pixel blocks of the first column, and the pixel blocks of the fourth column are stored in the banks B10 to B18 similarly to the pixel blocks of the second column. The residual pixel blocks of respective columns are stored in the banks B1 to B18 similarly.

In other words, other pixel data of the HD image are mapped in the respective banks B1 to B18 by use of the mapping pattern in which the pixel data of the area consisting of horizontal 128 pixels and vertical 72 pixels having the top pixel at the upper left corner of the HD image as the reference mapping pattern.

As the result, when pixel blocks in the horizontal direction in the HD image are regarded with attention, pixel blocks of each row are stored alternately in two banks, and when pixel blocks in the vertical direction in the HD image are regarded with attention, pixel blocks of each column are stored periodically in 9 banks.

For example, when the HD image of the first frame is mapped in the memory 2 as shown in FIG. 4, the HD image of the second frame is mapped, for example, as shown in FIG. 5.

In other words, the first row first column pixel block positioned at the upper left corner of the second frame stored in the bank B5, and the second row first column pixel block which is adjacent just under the first row first column pixel block is stored in the bank B6. Further, the third row first column block which is adjacent just under the second row first column pixel block is stored in the bank B7, and similarly in the following, the residual pixel blocks of the fourth row first column to the ninth row first column including pixels from the top pixel to the 72-nd pixel are stored respectively in the banks B8, B9, B1, B2, B3, and B4.

The first row second column pixel block consisting of pixels of 65-th to 128-th from the left and pixels of first to eighth from the top, which is positioned right (?2, left?)

adjacent to the first row first column pixel block of the HD image, is stored in the bank B14, the second row second column pixel block which is adjacent just under the first row second column pixel block is stored in the bank B15. Further, the third row second column pixel block which is adjacent just under the second row second column pixel block is stored in the bank B16, and similarly in the following, the residual pixel blocks of the fourth row second column to the ninth row second column including pixels from the top pixel to the 72-nd pixel are stored respectively in banks B17, B18, B10, B11, B12, and B13.

The first column 10-th row pixel block and following pixel blocks are stored synchronously in the banks B5 to B9, and B1 to B4 similarly to the pixel blocks of the first row first column to the ninth row first column, and the second column 10-th row pixel block and following pixel blocks are stored synchronously in the banks B14 to B18, and B10 to B13 similarly to the pixel blocks of the first row second column to the ninth row second column. Further, pixel blocks of the third column are stored in the banks B5 to B9, and B1 to B4 similarly to the pixel blocks of the first column, and the pixel blocks of the fourth column are stored in the banks B14 to B18 and B10 to B13 (?3) similarly to the pixel blocks of the second column. The residual pixel blocks of respective columns are stored in the banks B14 to B18, and B10 to B13 similarly.

In other words, the second frame is mapped with 4 pixel blocks shifting of the mapping pattern of the first frame in the column direction (downward).

The third frame is mapped with 4 pixel blocks shifting of the mapping pattern of the second frame in the column direction as shown in FIG. 6. Similarly in the following, the fourth frame and following frames are mapped successively with 4 pixel blocks shifting of the mapping pattern of the immediately precedent frame in the column direction.

On the other hand, the bank selector 3 (FIG. 1) successively selects 7 banks from among the banks B1 to B18 which are components of the memory 2, and the vertical pixel data which are components of the HD image are read out from the selected 7 banks.

In detail, the bank selector 3 selects 7 banks in which the total of 7 pixel blocks consisting of one pixel block of the precedent frame corresponding to the pixel block having the pixel data of the current frame which the bank selector 1 is now going to write and a pair of 3 pixel blocks adjacently positioned respectively just above and under the corresponding center pixel block are written. From the selected 7 banks, the pixel data of the same column which are components of the HD image are read out.

In detail, for example, now the HD image of the first frame is stored in the memory 2 as shown in FIG. 4, and the HD image of the second frame begins to be supplied. For example, when the 25-th row 30-th column pixel data is regarded with attention, because the pixel data belongs to the fourth row first column pixel block as shown in FIG. 5, the pixel data is written in the bank B8 which has been selected by the bank selector 1.

On the other hand, in the selector 3, the total of 7 pixel blocks consisting of one pixel block of the first frame corresponding to the pixel block having the 25-th row 30-th column pixel data of the second frame and a pair of 3 pixel blocks adjacently positioned respectively just above and -under the corresponding center pixel block, in other words, the bank B1 to B7 where the respective pixel blocks of the first row first column to the seventh row first column of the first frame have been written, are selected. The bank selector 3 reads out vertical pixel data of the respective pixel blocks of the first row first column to the second row first column of the first frame from the banks B1 to B7.

In detail, as described herein above, 8-pixel pixel data on one word line are read out from the respective banks B1 to B18 at a time, and the bank selector 3 reads out 8 pixels of the same column of the respective pixel blocks of the first row first column to seventh row first column of the first frame from the banks B1 to B7. As the result, the bank selector 3 reads out 56 pixels (=8 pixels×7 banks), which is continuous in the vertical direction of the HD image stored therein, from the memory 2.

In the present embodiment, the bank is selected so that pixel blocks adjacent in the vertical direction in the HD image are stored periodically in 9 banks when the pixel data is written. As the result, because respective arbitrary 7 pixel blocks adjacent in the vertical direction in the HD image stored in the memory 2 are always stored in banks different each other, 56 pixels of the same arbitrary column of such 7 pixel blocks can be read out quickly by bank switching.

In the bank selector 3, the pixel data for constituting the necessary area of the pixel data which the bank selector 1 writes is read out from the memory 2 in the above-mentioned 56 pixel unit.

In detail, in this case now, because the 25-th row 30-th column pixel data of the second frame has been written, the necessary area of this pixel data is the area of horizontal 48 pixels and vertical 48 pixels having the 25-th row 30-th column pixel data of the first frame at the center. In the bank selector 3, 56 pixels arranged on the same column are read out from the total 7 pixel blocks consisting of one pixel block having the 25-th row 30-th column pixel data of the first frame and a pair of 3 pixel blocks positioned respectively just above and under the pixel block having the 25-th row 30-th column pixel data, as described herein above, the pixel data sent out from the bank selector 3 includes the pixel data for constituting the necessary area in the column direction.

Therefore, with regard to the row direction, the bank selector 3 reads out successively only 48 columns having the 25-th row 30-th column pixel data of the first frame from among the 56 pixels arranged on the above-mentioned same column. As the result, in the bank selector 3, because the pixel data of the first frame in the area of 56 rows and 48 columns, which is specified by 56 rows covering the total 7 pixel blocks consisting of one pixel block having the 25-th row 30-th column pixel data of the first frame and a pair of 3 pixel blocks positioned respectively just above and under the pixel block having the 25-th row 30-th column pixel data and which is specified by 48 columns having the 25-th row 30-th column pixel data of the first frame, is read out, the pixel data includes the necessary area for the 25-th row 30-th column pixel data of the second frame.

Because the 48 columns having the 25-th row 30-th column pixel data of the first frame at the center are columns of the 6-th column to 53-rd column (or seventh column to 54-th column), the 48 columns are included in the total 7 pixel blocks consisting of one pixel block having the 25-th row 30-th column pixel data of the first frame and a pair of 3 pixel blocks positioned above the pixel block having the 25-th row 30-th column pixel data, and 3 pixel blocks positioned under the pixel block having the 25-th row 30-th column pixel data, namely the pixel blocks of the first row first column to the seventh row first column of the first frame.

However, for example, in the case that the 25-th row 64-th column pixel data of the second frame is to be written, because the necessary area of this pixel data is the area of horizontal 48 pixels and vertical 48 pixels having the 25-th row 64-th column pixel data of the first frame at the center, the writing overflows to the right from the total 7 pixel blocks consisting of one pixel block having the 25-th row 64-th column pixel data of the first frame and a pair of 3 pixel blocks positioned respectively just above and under the pixel block having the 25-th row 64-th column pixel data, namely the pixel blocks of the first row first column to the seventh row first column of the first frame. In other words, the necessary area for the 25-th row 64-th column pixel data of the second frame extends to the pixel blocks of the first row second column to the seventh row second column positioned adjacent to the respective pixel blocks of the first row first column to the seventh row first column of the first frame.

In this case, the bank selector 3 selects the banks B1 to B7 (FIG. 4) where the respective pixel blocks of the first row first column to the seventh row first column of the first frame, reads out the pixel data which constitutes the necessary area for the 25-th row 64-th column pixel data of the second frame, and then selects the banks B10 to B16 (FIG. 4) where the respective pixel blocks of the first row second column to seventh row second column in the first frame adjacent in the right, and reads out the pixel data which constitutes the necessary area for the 25-th row 64-th column pixel data of the second frame.

At that time, because the bank is selected so that pixel blocks adjacent horizontally each other on the HD image are stored alternately in two banks when the pixel data is written, reading out is performed quickly even when the pixel data of two pixel blocks adjacent horizontally each other is read out as described herein above.

In other words, when the continuous data is read/written with addressing on a certain bank, because it takes a certain time period to switch the word line if the word line of the memory cell to be read/written is different, the amount of time for reading/writing data is longer in comparison with the case that memory cells on the same word line are addressed. To avoid this problem, in the present embodiment, the pixel data which constitutes one pixel block is stored in memory cells on one word line of the bank to thereby shorten the amount of time for reading/writing data as described with reference to FIG. 2 and FIG. 3.

In detail, for example, when the first row second column pixel block positioned adjacent on the right of the first row first column pixel block is to be read out from the memory 2 subsequently to the first row first column pixel block, read out time delay due to switching of the word line is caused if these two pixel blocks to be read out consecutively are stored in the same bank.

On the other hand, in FIG. 4, the first row first column pixel block is stored in the bank B1 and the first row second column pixel block positioned adjacent on the right of the first row first column pixel block is stored in the bank B2. Therefore, when the first row first column pixel block is read out and then the first row second column pixel block positioned adjacent on the right is to be read out subsequently, because these two pixel blocks are stored in different respective banks, it is possible to activate the word line on the memory cell of the bank 2, which is different from the bank B1 where the first row first column pixel block is stored and where the first row second column pixel block is stored, before completion of reading out of the first row first column pixel block, as the result, the read out time delay due to switching of the word line is prevented.

Next, for example, when the 25-th row 30-th column pixel data of the second frame is addressed with attention, the bank B8 is selected and written in the bank selector 1 as described herein above. Further, at that time, the bank selector 3 reads out the pixel data to obtain the necessary area for the 25-th row 30-th column pixel data of the second frame from the banks B1 to B7.

It is required to perform reading/writing of the pixel data simultaneously in order to secure real time processing. In the present embodiment, writing of the 25-th row 30-th column pixel data of the second frame is addressed to the bank B8, and reading out of the pixel data to obtain the necessary area is addressed to the banks B1 to B7, that is, the writing and reading out of the pixel data are performed with addressing to respective different banks, the writing and reading out can be therefore performed simultaneously.

Next, for example, because the pixel data of the first frame which constitutes the necessary area for other pixel data of the second frame is stored in the bank B5 (FIG. 4) where the first row first column pixel data positioned at the upper left corner of the second frame is written, the process can not be performed unless the pixel data of the first frame is held until the writing of the pixel data of the second frame which constitutes the necessary area is completed by use of the pixel data of the first frame.

In other words, the fifth row first column pixel block of the first frame is stored first in the bank B5 as shown in FIG. 4, and this pixel block becomes needless first in the order of the processing. Because the fifth row first column pixel block of the first frame shown in FIG. 4 is positioned at the place 3 pixel blocks apart above the eighth row first column pixel block of the second frame shown in FIG. 5, the fifth row first column pixel block of the first frame has the pixel data which constitutes the necessary area for the pixel data of the eighth row first column pixel block of the second frame, it is therefore required to hold the fifth row first column pixel block in the memory 2 until the writing of the pixel data which constitutes the eighth row first column pixel block of the second frame is completed.

For example, if the fifth row first column pixel block of the first frame is held until the writing of the eighth row pixel block of the second frame supplied in the order of line scanning is completed, it is required to write the first row pixel block of the second frame every second pixel block as shown in FIG. 5 in the bank B5 (FIG. 4) where the fifth row first column pixel block of the first frame is stored during the holding.

In the present embodiment, the 1 frame HD image consists of 1920 horizontal pixels and 1080 vertical pixels and 1 pixel block consists of 64 horizontal pixels and 8 vertical pixels, it is therefore required to have a memory capacity of 30 (=1920/64) horizontal pixel blocks and 135 (=1080/8) vertical pixel blocks to store 1 frame HD image.

The number of pixel blocks which constitute the first row of the pixel block of the second frame is 30, accordingly 15 pixel blocks, which is an half of the number of the first row pixel blocks, is written in the bank B5.

As described herein above, if the 15 pixel block free capacity is available after writing of the first frame, by writing the pixel data of the second frame therein, it is possible to hold the fifth row first column pixel block of the first frame until the writing of the eighth row pixel block of the second frame is completed.

Based on the explanation described herein above, it is obvious that the memory capacity of 30×135 pixel blocks is required to store 1 frame HD image. In the present embodiment, the memory 2 comprises 18 banks, and the data of 1 frame HD image is stored in respective 18 banks of the memory 2 equally, then the data of the amount corresponding to 30×125/18=225 pixel blocks is stored in each bank.

On the other hand, each bank which is a component of the memory 2 has 256 word lines as shown in FIG. 2, and each word line is corresponding to 1 pixel block, thus each bank has the capacity of 256 pixel blocks. Therefore, when 1 frame HD image is stored in the memory 2, free capacity of 256−225=31 blocks are available in each block.

As described herein above, the bank B5 has free capacity which is sufficient for writing 15 pixel block of the second frame, therefore, it is possible by writing the pixel data of the second frame therein to hold the fifth row first column pixel block of the first frame until the writing of the eighth row pixel block of the second frame is completed. As the result, writing and reading out of the pixel data can be performed simultaneously without failure of the processing.

The same is true for other banks. Further, for example, because the fifth row first column pixel block of the first frame stored in the bank B5 becomes needless after completion of the writing of the eighth row pixel block of the second frame in the case described herein above, after that, it becomes possible to write the pixel data of the second frame in the memory cell of the bank B5 where the fifth row first column pixel block of the first frame has been stored.

A method for giving the address to the memory 2 when writing and reading out of the pixel data are performed simultaneously without failure of the processing as described herein above is disclosed in detail in Japanese Patent Application Number Hei 10-32913 applied previously by the applicant of the present invention.

The 56-pixel pixel data generated by the bank selector 3 (FIG. 1) is supplied to the load/shift circuit 4. The load/shift circuit 4 selects only the pixel data which constitutes the vertical component of the necessary area from among the 56-pixel pixel data generated by the bank selector 3, in other words, 48-pixel pixel data is selected and supplied to the two-dimensional parallel array 5.

When a certain pixel data of the current frame is supplied to the image processing device shown in FIG. 1, 56 pixels arranged in the same column is read out from the total 7 pixel blocks consisting of one pixel block having the pixel data stored already in the memory 2 corresponding to the pixel data of the current frame and a pair of 3 pixel blocks positioned respectively just above the center pixel block stored already in the memory 2, the pixel data generated by the bank selector 3 always includes the pixel data for constituting the necessary area for the pixel data of the current frame in the column direction as described herein above. The load/shift circuit 4 can therefore select only the pixel data for constituting the vertical component of the necessary area from among the 56-pixel pixel data generated by the bank selector 3.

In the two-dimensional parallel array 5, 48 pixel data supplied from the load/shift circuit 4 are stored in the respective registers of the first row first column to 48-th row first column similarly to the two-dimensional parallel array 103 shown in FIG. 12, in the following, every time when a new 48 pixel data are supplied, the pixel data stored in each register is shifted successively to the adjacent right-hand side register. As described herein above, the two-dimensional parallel array 5 stores the pixel data which constitutes the necessary area for the pixel data supplied to the bank selector 1.

Further, the pixel selector 6 suitably selects the pixel data which is to be used for processing the pixel data supplied to the processing circuit 7 from among the pixel data in the necessary area stored in the two-dimensional parallel array 5 and supplied the selected pixel data to the processing circuit 7 similarly to the pixel selector 104 (?4) shown in FIG. 12. The processing circuit 7 performs the predetermined processing by use of the pixel data supplied to the bank selector 1 and the pixel data supplied from the pixel selector 6, and sends out the processing result.

Next, referring to FIG. 7A to FIG. 7C and FIG. 8A to FIG. 8C, a method for mapping the image on banks which are components of the memory 2 is described.

Figure 7A:
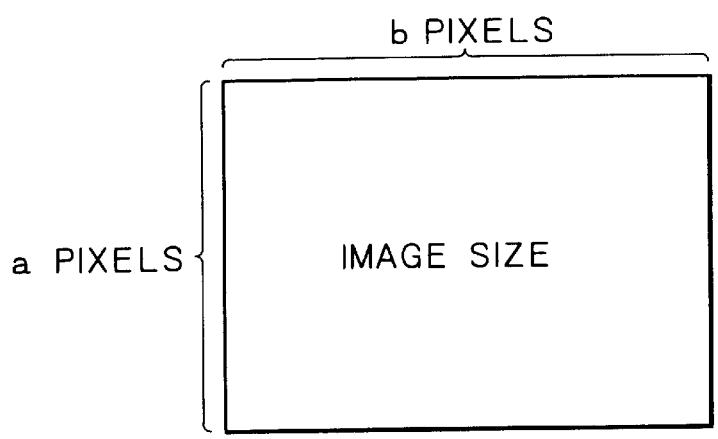
FIG. 7A to FIG. 7C are diagrams for describing a method for mapping of the image on each bank which is an component of the memory 2.
Figure 7B:
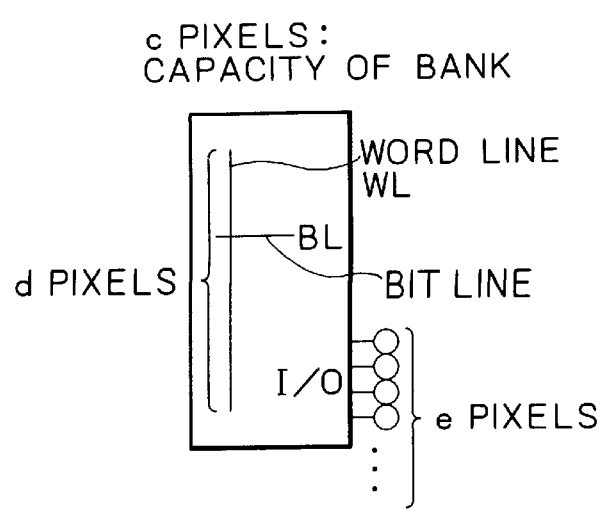
Figure 7C:
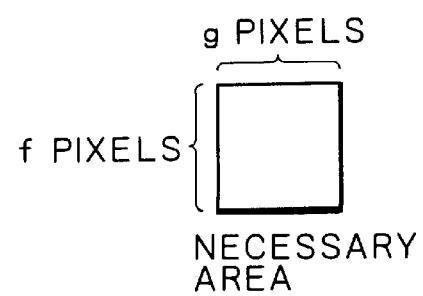

As shown in FIG. 7A, the number of pixels in the vertical direction and the horizontal direction, which constitute addressed 1 frame pixel data, is respectively represented by a and by b. Further, as shown in FIG. 7B, the number of pixels which can be stored in one bank is represented by c, the number of pixels which can be stored in the memory cell on one word line of a bank is represented by d, and the number of pixels which a bank can read out simultaneously is represented by e. Further, as shown in FIG. 7C, the number of pixels of a necessary area is represented by f for the vertical direction and by g for the horizontal direction.

In this case, as shown in FIG. 8A, it is required that the memory 2 comprises h or more banks having the structure as shown in FIG. 7B, wherein h is represented by the following equation.

$$h=F(a \times b/c)+2$$

wherein F(x) represents the minimum even number which is equal to or larger than x.

As shown in FIG. 8B, a pixel block consists of e pixels in the vertical direction and d/e pixels in the horizontal direction, wherein the number of pixels in the horizontal direction is represented by a value obtained by omitting the decimal part of d/e if d/e is not an integer.

h banks are represented individually by banks #1, #2, . . . , #h/2, . . . , #h, for example, as shown in FIG. 8C, the first row first column pixel block (as described herein above, having e pixels in the vertical direction and d/e pixels in the horizontal direction) positioned at the upper left corner of the image to be processed shown in FIG. 7A is stored in the bank #1, and the second row first column pixel block positioned immediately under the first row first column pixel is stored in the bank #2. Further the third row first column pixel block positioned immediately under the second row first column pixel block is stored in the bank #3, and similarly in the following, the residual pixel blocks of the fourth row first column to the h/2 row first column positioned at places from the top to h/2 are stored in respective banks #4 to #h/2.

The first row second column pixel block positioned immediately on the right-hand side of the first row first column pixel block to be processed is stored in the bank # (h/2+1), and the second row second column pixel block positioned immediately under the first row second column pixel block is stored in the bank # (h/2+2). Further, the third row second column pixel block positioned immediately under the second row second column pixel block is stored in the bank # (h/2+3), and similarly in the following, the residual pixel blocks of the fourth row second column to the h/2 row second column positioned at places from the top to h/2 are stored in respective banks # (h/2+4) to #h.

The (h/2+1) row first column pixel block and the following pixel blocks are stored again synchronously in the banks

1 to #h/2, and the (h/2+1) row second column pixel block and the following pixel blocks are stored again synchronously in the banks # (h/2+1) to #h. Further, pixel blocks of the third column is stored in the banks #1 to h/2 similarly to the pixel blocks of the first column, and pixel blocks of the fourth column is stored in the banks # (h/2+1) to #h similarly to the pixel blocks of the second column. Similarly in the following, pixel blocks of the respective columns are stored in the banks #1 to #h.

In other words, the pattern in which the pixel data in the form of matrix area having two pixel blocks in the horizontal direction and h/2 pixel blocks in the vertical direction positioned on the upper left corner of the HD image is mapped in the respective banks #1 to #h is used as the reference mapping pattern for mapping other pixel data of the image to be processed in the respective banks #1 to #h.

As the result, when pixel blocks of the image to be processed are addressed with attention in the horizontal direction, pixel blocks on any one row are stored in two banks alternately, on the other hand, when pixel blocks are addressed with attention in the vertical direction, pixel blocks on any one column are stored in h/2 banks periodically.

Otherwise mapping may be performed in a way, for example, that the first row first column pixel block is stored in the bank #1, the first row second column pixel block is stored in the bank #2, the second row first column pixel block is stored in the bank #3, and so on.

When the pixel data is read out, the bank selector 3 selects banks which respectively stores the total of (f/e+1) (if (f/e+1) has a decimal part, the value obtained by omitting the decimal part) pixel blocks consisting of one pixel block of the precedent frame stored already in the memory 2 corresponding to the pixel block having the pixel data supplied to the bank selector 1 and a predetermined number of pixel blocks adjacently positioned respectively above and under the center pixel block, and reads out the pixel data of the same column of the pixel blocks stored therein.

To secure the real time processing, namely, to perform writing and reading simultaneously, it is required that the number of banks selected by the bank selector 3 is (h/2−1) or smaller.

As described herein above, the pixel data is written in a bank selected from among a plurality of banks B1 to B18 and other two or more banks are selected from among the plurality of banks B1 to B18 to read out the pixel data therefrom, and only the necessary pixel data is selected, as the result, it is possible to obtain the two-dimensional pixel block consisting of the desired number of pixels in the horizontal direction and in the vertical direction by converting the pixel data supplied continuously in the horizontal direction, namely in the order of line scanning, to the pixel data which is continuous in the vertical direction without using the line memory for temporarily storing the pixel data of the necessary number of lines.

As the result, for example, miniaturization of the motion detecting circuit for detecting motion in MPEG, the classification adaptive processing circuit, and other circuits for extracting the two-dimensional pixel blocks from an image for processing is realized.

The classification application processing is described herein under.

In the classification application processing, the high frequency component which is not included in an SD image is restored by performing the adaptive processing for calculating the predictive value of the pixel of the HD (High Density) image by linear combination of, for example, the SD (Standard Density) image and a predetermined prediction coefficient.

In detail, for example, the prediction value E[y] of the pixel value y of the pixel which is the component of the HD image (referred to as HD pixel hereinafter) is calculated from pixel values (referred to as learning data hereinafter) $x_1, x_2, \ldots$ of some SD pixels (pixel which constitutes the SD image) and the linear combination model specified by linear combination of predetermined prediction coefficients $w_1, w_2, \ldots$. In this case, the prediction value E[y] is represented by the following equation.

$$E[y] = w_1 x_1 + w_2 x_2 + \quad (1)$$

For generalization, the matrix W comprising the set of prediction coefficients, the matrix X comprising the set of learning data, and the matrix Y' comprising prediction values E[y] are defined by the following equations:

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}$$

$$W = \begin{bmatrix} W_1 \\ W_2 \\ \cdots \\ W_n \end{bmatrix}, Y' = \begin{bmatrix} E[y_1] \\ E[y_2] \\ \cdots \\ E[y_m] \end{bmatrix}$$

Accordingly, the following observation equation is applicable.

$$XW = Y' \quad (2)$$

The method of least squares is applied to the observation equation to calculate the prediction value E[y] which is approximate to the pixel value y of the HD pixel. In this case, the matrix Y comprising the set of true pixel values y of the HD pixel which is served as the teacher data and the matrix E comprising the set of residuals e of the prediction value E[y] with respect to the pixel value y of the HD pixel are defined by the following equations:

$$E = \begin{bmatrix} e_1 \\ e_2 \\ \cdots \\ e_m \end{bmatrix}, Y = \begin{bmatrix} y_1 \\ y_2 \\ \cdots \\ y_m \end{bmatrix}$$

Accordingly, the following residual equation is applicable.

$$XW = Y + E \quad (3)$$

In this case, the prediction coefficient $w_i$ for calculating the prediction value E[y] which is approximate to the pixel value y of the HD pixel is calculated by minimizing $$\sum_{i=1}^{m} e_i^2$$

the square error represented by the following equation:

When the above-mentioned square error differentiated with respect to the prediction coefficient $w_j$ is equal to zero, that is, the prediction coefficient $w_j$ which satisfies the following equation is the optimal value for calculating the prediction value E[y] which is approximate to the pixel value y of the HD pixel.

$$e_1 \frac{\partial e_1}{\partial w_i} + e_2 \frac{\partial e_2}{\partial w_i} + \ldots + e_m \frac{\partial e_m}{\partial w_i} = 0 \quad (i = 1, 2, \ldots, n) \qquad (4)$$

First, by differentiating the equation (3) with respect to the prediction coefficient $w_j$, the following equation is applicable.

$$\frac{\partial e_i}{\partial w_1} = x_{i1}, \frac{\partial e_1}{\partial w_2} = x_{i2}, \ldots, \frac{\partial e_1}{\partial w_n} = x_{in}, \quad (i = 2, \ldots, m) \qquad (5)$$

The equation (6) is obtained from the equations (4) and (5).

$$\sum_{i=1}^{m} e_i x_{i1} = 0, \sum_{i=1}^{m} e_i x_{i2} = 0, \ldots \sum_{i=1}^{m} e_i x_{in} = 0 \qquad (6)$$

Considering the relation between the learning data x of the residual equation (3), the prediction coefficient y, and the residual e, the following normal equation is obtained from the equation (6).

$$\begin{cases} \left(\sum_{i=1}^{m} x_{i1} x_{i1}\right) w_1 + \left(\sum_{i=1}^{m} x_{i1} x_{i2}\right) w_2 + \ldots + \left(\sum_{i=1}^{m} x_{i1} x_{in}\right) w_n = \left(\sum_{i=1}^{m} x_{i1} y_i\right) \\ \left(\sum_{i=1}^{m} x_{i2} x_{i1}\right) w_1 + \left(\sum_{i=1}^{m} x_{i2} x_{i2}\right) w_2 + \ldots + \left(\sum_{i=1}^{m} x_{i2} x_{in}\right) w_n = \left(\sum_{i=1}^{m} x_{i2} y_i\right) \\ \ldots \\ \left(\sum_{i=1}^{m} x_{in} x_{i1}\right) w_1 + \left(\sum_{i=1}^{m} x_{in} x_{i2}\right) w_2 + \ldots + \left(\sum_{i=1}^{m} x_{in} x_{in}\right) w_n = \left(\sum_{i=1}^{m} x_{in} y_i\right) \end{cases} \qquad (7)$$

The normal equation represented by the equation (7) can be obtained in the same number as that of the prediction coefficients w to be calculated, therefore by solving the equation (7) (to solve the equation (7), the matrix consisting of the coefficient which is multiplied by the prediction coefficient w should be regular), the optimal prediction coefficient w can be calculated. To solve the equation (7), for example, the sweeping out method (elimination method of Gauss-Jordan) may be applied.

The method that the optimal prediction coefficient w has been calculated as described herein above and the prediction value E[y] which is approximate to the pixel value y of the HD pixel is calculated by the equation (1) using the prediction coefficient w is the adaptive processing.

The adaptive processing is different from the interpolation processing in that the component included in the HD image and not included in the SD image is reproduced. In detail, in the adaptive processing is the same processing as the interpolation processing in which so-called interpolating filter is used so far as the equation (1) is concerned, but because the prediction coefficient w which is corresponding to the tap coefficient of the interpolation filter is calculated by so-called learning in which the teacher data y is used, the component included in the HD image is reproduced. In other words, the high resolution image is obtained easily. From the above-mentioned view point, it is said that the adaptive processing can be regarded as processing for creating the image (resolution imagination).

Figure 9:
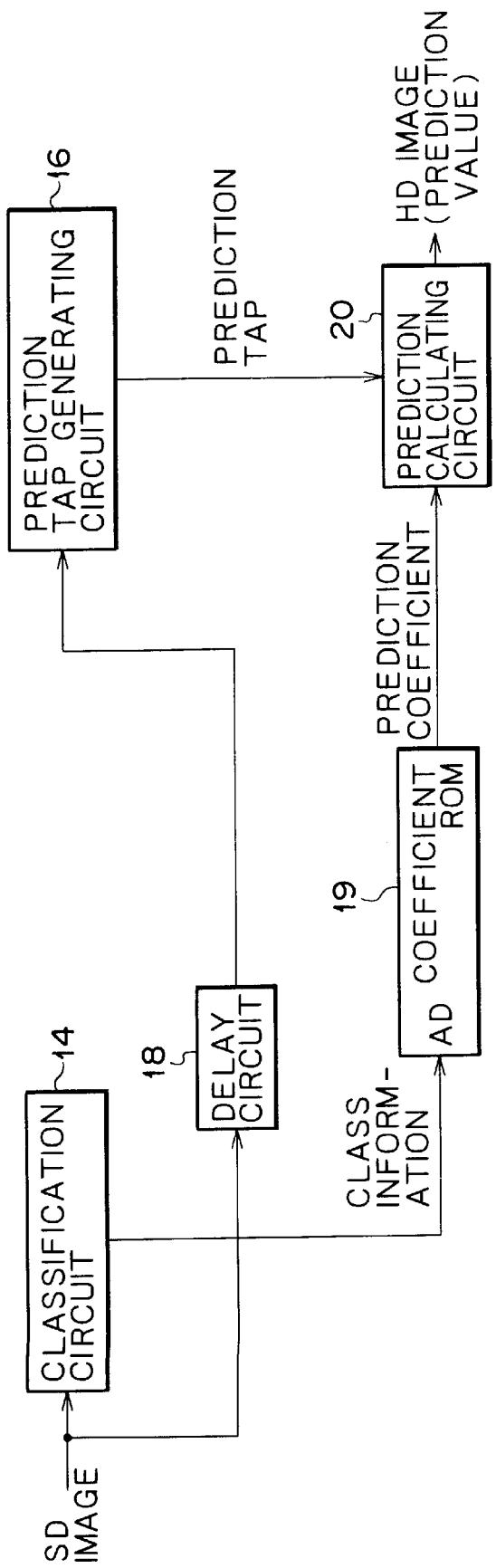
FIG. 9 is a block diagram for illustrating an exemplary structure of a classification adaptive processing circuit.

FIG. 9 shows an exemplary structure of a classification adaptive processing circuit for converting the SD image to the HD image through the adaptive processing as described herein above.

An SD image is supplied to a classification circuit 14 and delay circuit 18, and the classification circuit 14 classifies the HD pixel which includes the prediction value to be calculated by the adaptive processing (referred to as addressed pixel hereinafter) into predetermined classes based on the SD image.

In detail, the classification circuit 14 first extracts a block (referred to as process block hereinafter) consisting of SD pixels which are positioned, for example, within a distance equal to or smaller than a predetermined value from an addressed pixel as the SD pixel positioned near the addressed pixel to form a process block. For example, the value which has been previously assigned to the pattern of the pixel value of all the SD pixels is supplied to an address terminal (AD) of a coefficient ROM 19.

In detail, the classification circuit 14 extracts, for example, the class tap consisting of 4×4 SD pixels (indicated with mark ○ in FIG. 10) positioned around the addressed pixel from the SD image, and generates values corresponding to the pattern of the pixel value of these 16 SD pixels as the class of the addressed pixel.

If many bits such as 8 bits are allocated to represent the pixel value of each SD pixel, the number of pixel value of these 16 SD pixels amounts to a number as huge as $(2^8)^{16}$, and the huge number makes the following processing slow.

To avoid such problem, for example, ADRC (Adaptive Dynamic Range Coding) processing is applied to the class tap to reduce the number of bits of the component SD pixels as a pre-processing for classification.

In detail, in ADRC processing, the SD pixel having the maximum pixel value (referred to as maximum pixel hereinafter) and the SD pixel having the minimum pixel value (referred to as minimum pixel hereinafter) are detected from among the 16 SD pixels which are components of the class tap. The difference DR (=MAX−MIN) between the pixel value MAX of the maximum pixel and the pixel value MIN of the minimum pixel is calculated, the DR is used as the local dynamic range of the class tap, and each pixel value which is a component of the class tap is re-quantized to form K bits pixel value which is smaller than the originally allocated number of bits based on this dynamic range DR. In other words, the pixel value MIN of the minimum pixel is subtracted from each pixel value of pixels which are component of the class tap, and each subtracted value is divided by $DR/2^K$.

As the result, each pixel value of the pixels which are components of the class tap is represented by K bits. Therefore for example, if K=1, the number of patterns of the pixel value of 16 SD pixels is $(2^1)^{16}$, the number of patterns is significantly smaller than that in the case of processing without ADRC processing.

The coefficient ROM 19 stores prediction coefficients which have been previously calculated by learning with respect to each class, and when a class is supplied from the classification circuit 14, the coefficient ROM 19 reads out the prediction coefficient stored in the address corresponding to the supplied class and supplies it to a prediction calculating circuit 20.

On the other hand, the delay circuit 18 delays the SD image for the amount of time which is necessary to coincide the timing when the prediction coefficient is supplied from the coefficient ROM 19 to the prediction calculating circuit 20 with the timing when the prediction tap is supplied from a prediction tap generating circuit 16, which will be described hereinafter, to the prediction calculating circuit 20, and the delayed SD image is supplied to the prediction tap generating circuit 16.

The prediction generating circuit 16 extracts the SD pixel used for calculating the prediction value of the addressed pixel in the prediction calculating circuit 20 from the SD image supplied thereto, and supplies the extracted SD pixel to the prediction calculating circuit 20 as the prediction tap. In other words, the prediction tap generating circuit 16 extracts, for example, the same class tap as extracted by the classification circuit 14 form the SD image, the SD pixels which are components of the class tap are supplied to the prediction calculating circuit 20 as the prediction tap.

The prediction calculating circuit 20 performs the calculation represented by the equation (1) by use of the prediction coefficients $w_1, w_2, \ldots$ supplied from the coefficient ROM 19 and the prediction taps $x_1, x_2, \ldots$ supplied from the prediction tap generating circuit 16 to calculate the prediction value $E[y]$ of the addressed pixel y, and generates the prediction value $E[y]$ as the pixel value of the HD image.

The same processing is performed taking other HD pixels as the addressed pixel in the following process to thereby convert the SD image to HD image.

Figure 11:
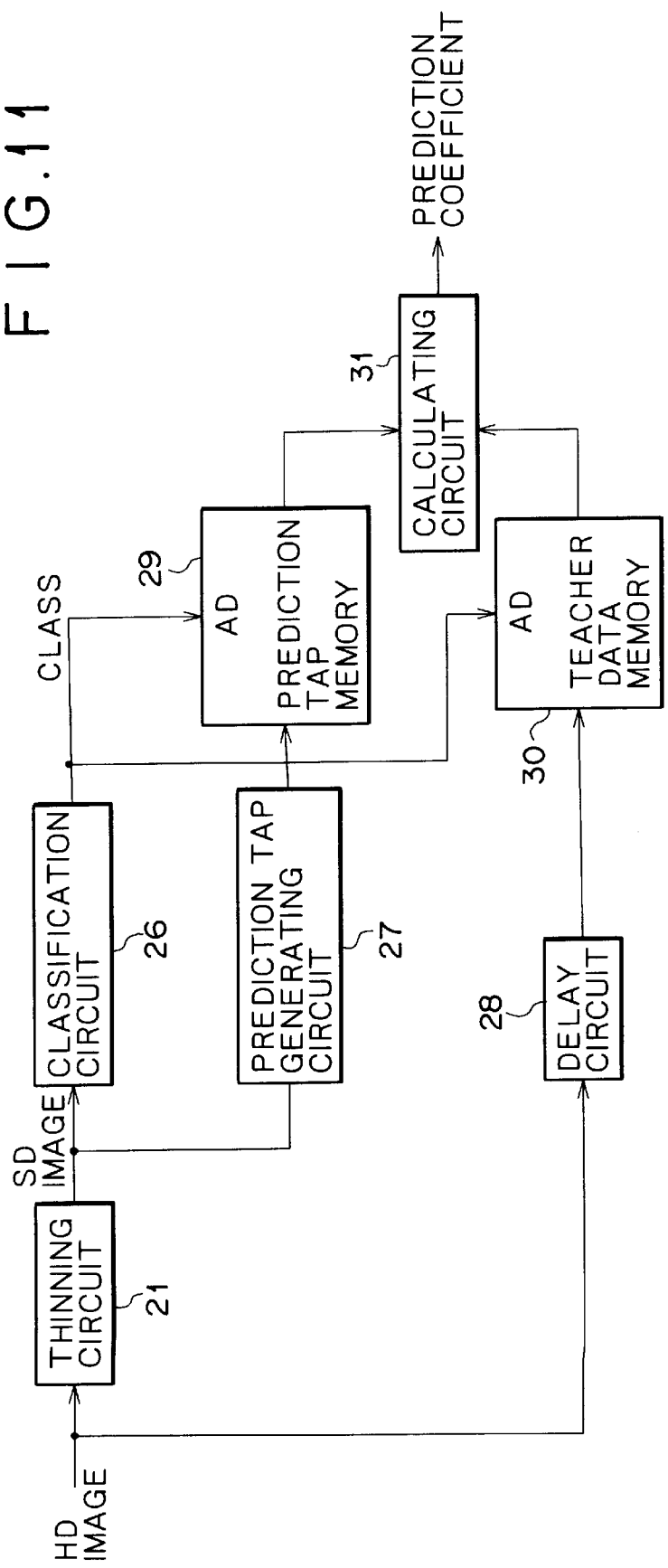
FIG. 11 is a block diagram for illustrating an exemplary structure of a learning device.

Next, FIG. 11 shows an exemplary structure of a learning device for performing learning processing to calculate the prediction coefficient to be stored in the coefficient ROM 19 shown in FIG. 9.

The HD image to be served as learning data y in learning is supplied to a thinning circuit 21 and a delay circuit 21, the thinning circuit 21 thins, for example, the number of pixels to reduce it, and the thinned HD image is served as the SD image. The SD image is supplied to a classification circuit 26 and prediction tap generating circuit 27.

In the classification circuit 26 or prediction tap generating circuit 27, the same processing as that performed in the classification circuit 14 or prediction tap generating circuit 16 shown in FIG. 9 is performed, the class of the addressed pixel or the prediction tap is thereby generated. The class generated from the classification circuit 26 is supplied to the address terminal (AD) of a prediction tap memory 29 and the address terminal (AD) of a learning data memory 30, and the prediction tap generated by the prediction tap generating circuit 27 is supplied to the prediction tap memory 29.

In the prediction tap memory 29, the prediction tap supplied from the prediction tap generating circuit 27 is stored in the address corresponding to the class supplied from the classification circuit 26.

On the other hand, in the delay circuit 28, the HD image is delayed for an amount of time which is necessary to supply the class corresponding to the addressed pixel from the classification circuit 26 to a teacher data memory 30, and only the pixel value of the HD pixel which is the addressed pixel out of the delayed HD pixel is supplied to the teacher data memory 30 as the teacher data.

The teacher data memory 30 stores the teacher data supplied from the delay circuit 28 in the address corresponding to the class supplied from the classification circuit 26.

The same processing is repeated until all the HD pixels which constitute all the HD images prepared previously for learning are processed as the addressed pixel.

Figure 10:
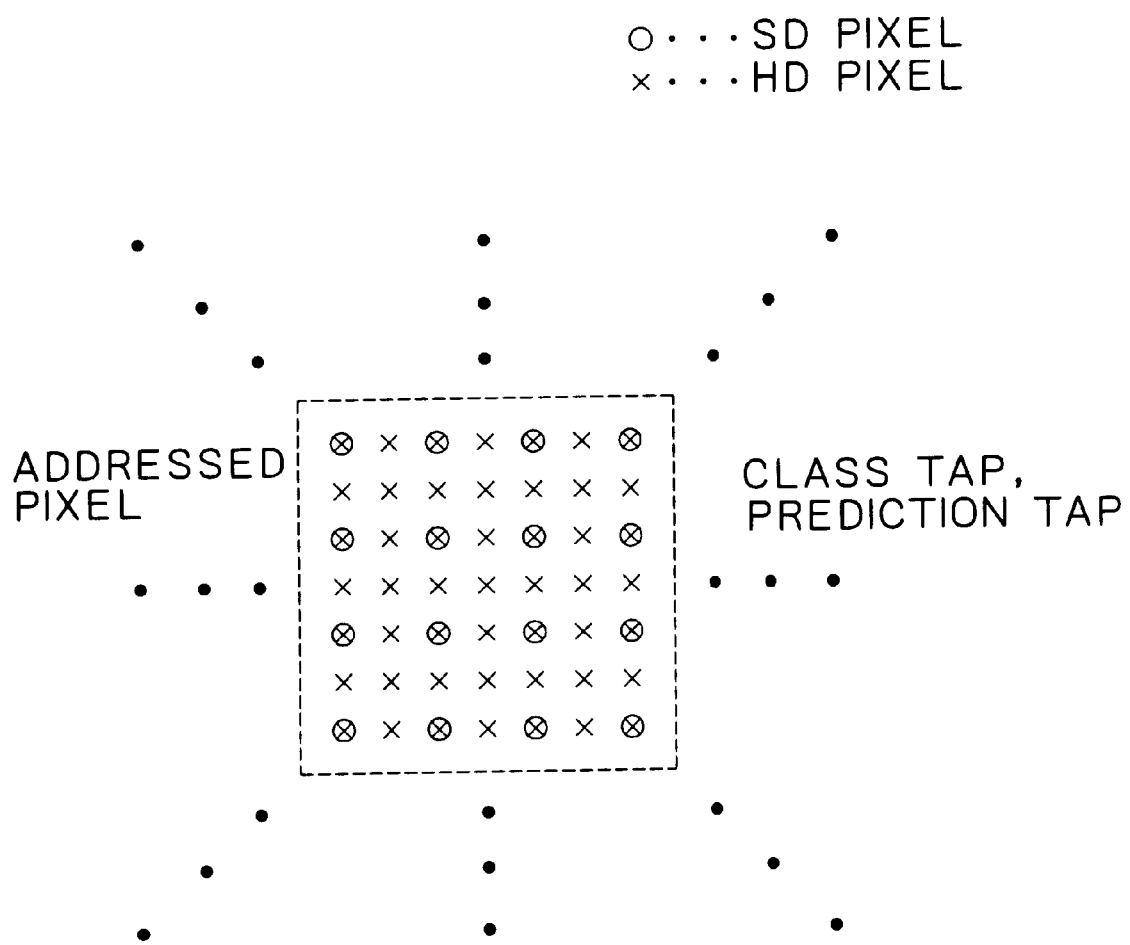
FIG. 10 is a diagram for illustrating the processing in the classification circuit 14 shown in FIG. 9.

The SD pixel or HD pixel having the same positional relation respectively to the SD pixel indicated with the mark ○ in FIG. 10 or the HD pixel indicated with the mark X in FIG. 10 are stored as the learning data x or teaching data y in the same address in the prediction tap memory 29 or the teacher data memory 30.

The prediction tap memory 29 and the teacher data memory 30 are structured so as to store a plurality of information in the same address, and a plurality of learning data x and teacher data y which are classified to the same class are thereby stored in the same address.

Next, the calculating circuit 31 reads out the prediction tap served as the learning data or the pixel value of the HD pixel served as the teacher data stored in the same address from the prediction tap memory 29 or the teacher data memory 30, and calculates the prediction coefficient for minimizing the difference between the prediction value and the teacher data by the method of least squares by use of these read out prediction tap and pixel value. In the calculating circuit 31, the normal equation represented by the equation (7) is obtained for respective classes, and the prediction coefficient is obtained by solving the equations.

The prediction coefficient for respective classes obtained in the calculating circuit 31 as described herein above is stored in the address corresponding to the class in the coefficient ROM 19 shown in FIG. 9.

In the learning processing as described herein above, some classes may not get the number of normal equations required to calculate the prediction coefficient, however in such case, for example, the prediction coefficient obtained by solving the normal equation with ignoring the class is used as so-called default prediction coefficient.

The image processing device for detecting the necessary area from the image and processing the necessary area is applicable to a classification adaptive processing circuit (FIG. 9) and a learning device (FIG. 11), which are devices for detecting the class tap and prediction tap from the image for processing.

In the present embodiment, the case that the pixel which distributes in the spatial direction is detected, however it is possible to detect the pixel which distributes in the temporal direction. Also it is possible to detect the pixel which distributes both in spatial direction and in temporal direction, namely three-dimensional necessary area.

What is claimed is:

1. A memory device for storing image data having a horizontal pixel data component, comprising:

memory means having a plurality of memory banks;

write selecting means for selecting one memory bank from among said plurality of memory banks and for writing the horizontal pixel data component of said image data in said selected memory bank said write selecting means successively selecting memory banks so that the horizontal pixel data is stored in pixel blocks in a memory cell of one word line in said plurality of respective memory banks;

read out selecting means for selecting other two or more memory banks from among said plurality of memory banks and for reading out said data therefrom; and data selecting means for selecting said data generated from said read out selecting means.

2. A memory device for storing image data comprising:

memory means having a plurality of memory banks;

write selecting means for selecting one memory bank from among said plurality of memory banks and for writing said data therein, said write selecting means writing horizontal pixel data of said image data in said one selected memory bank;

read out selecting means for selecting two or more other memory banks from among said plurality of memory banks and for reading out data therefrom, said read out selecting means reading out vertical image data of said image data stored in the two or more selected memory banks; and data selecting means for selecting said data generated from said read out selecting means.

3. A memory device as claimed in claim 2, wherein said memory bank is a semiconductor memory.

4. A memory device as claimed in claim 3, wherein said write selecting means successively selects one memory bank from among said plurality of memory banks so that the pixel data which is the component of said image data is stored in said plurality of respective memory banks in predetermined pixel block unit; and
  said memory bank stores said pixel data which is the component of said pixel block in a memory cell on one word line.

5. A memory device as claimed in claim 4, wherein said memory bank is the semiconductor memory which is capable of simultaneously reading all said pixel data arranged in the vertical direction which are components of said pixel block.

6. A memory device as claimed in claim 4, wherein:
  the number of pixels in the vertical direction or horizontal direction which are components of said image data of one image is represented by a or b;
  the number of pixels which can be stored in one said memory bank is represented by c;
  the number of pixels which can be stored in a memory cell on one word line of said memory bank is represented by d;
  the number of pixels which can be read out simultaneously by said memory bank is represented by e; and
  the number of pixels selected by said data selecting means is represented by f;
  said memory means has said memory banks of the number h represented by the equation:

$h=F(a\times b/c)+2,$ wherein F(x) represents the minimum even number equal to or larger than x;
  said pixel block consists of e pixels in the vertical direction and the number of pixels equal to the maximum integer equal to or smaller than d/e in the horizontal direction; and
  said read out selecting means selects memory banks of the number equal to the minimum integer i equal to or larger than (f/e+1) from said plurality of memory banks and reads out said pixel data.

7. A memory device as claimed in claim 1, wherein said write selecting means selects one memory bank from among said plurality of memory banks so that said pixel blocks adjacent each other on said image data are stored in different said memory banks.

8. A memory device as claimed in claim 7, wherein said write selecting means selects one memory bank from among said plurality of memory banks so that said pixel blocks positioned adjacent each other in the horizontal direction on said image data are stored alternately in two said memory banks.

9. A memory device as claimed in claim 7, wherein said write selecting means selects one memory bank from among said plurality of memory banks so that said pixel blocks adjacent each other in the vertical direction on said image data are stored periodically in h/2 said memory banks.

10. A memory device as claimed in claim 9, wherein the number i of said memory banks selected by said read out selecting means is (h/2−1) or smaller.

11. A write method for writing image data in a memory device for storing said image data, said memory device comprising:
  memory means having a plurality of memory banks; and
  write selecting means for selecting one memory bank from among said plurality of memory banks and for writing the horizontal pixel data which is the component of said image data in said selected memory bank, wherein:
  said write selecting means successively selects one memory bank from among said plurality of memory banks so that said pixel data is stored in said plurality of respective memory banks in a predetermined pixel block unit, and
  said memory bank stores said pixel data which is the component of said pixel block in a memory cell on one word line.

12. A write method as claimed in claim 11, wherein said memory bank is the semiconductor memory which is capable of simultaneously reading out all said pixel data arranged in the vertical direction which are components of said pixel block.

13. A write method as claimed in claim 11, wherein:
  the number of pixels in the vertical direction or horizontal direction which are components of said image data of one image is represented by a or b,
  the number of pixels which can be stored in one said memory bank is represented by c,
  the number of pixels which can be stored in a memory cell on one word line of said memory bank is represented by d, and
  the number of pixels which can be read out simultaneously by said memory bank is represented by e, and
  said memory means has said memory banks of the number h represented by the equation:

$h=F(a\times b/c)+2,$ wherein F(x) represents the minimum even number equal to or larger than x,
  said pixel block consists of e pixels in the vertical direction and the number of pixels equal to the maximum integer equal to or smaller than d/e in the horizontal direction.

14. A write method as claimed in claim 13, wherein said write selecting means selects one memory bank from among said plurality of memory banks so that said pixel blocks adjacent each other on said image data are stored in different said memory banks.

15. A write method as claimed in claim 14, wherein said write selecting means selects one memory bank from among said plurality of memory banks so that said pixel blocks positioned adjacent each other in the horizontal direction on said image data are stored alternately in two said memory banks.

16. A write method as claimed in claim 14, wherein said write selecting means selects one memory bank from among said plurality of memory banks so that said pixel blocks adjacent each other in the vertical direction on said image data are stored periodically in h/2 said memory banks.

17. A read out method for reading out image data from a memory device that stores said image data, wherein:
  said memory device is provided with a plurality of memory banks, when one memory bank is successively selected from among said plurality of memory banks and horizontal pixel data of said image data has been written successively, two or more memory banks are selected from among said plurality of memory banks and vertical pixel data of said image data is read out from said two or more memory banks.

18. A read out method as claimed in claim 17, wherein said memory bank is a semiconductor memory.

19. A read out method as claimed in claim 18, wherein in the case that:
one memory bank is successively selected from among said plurality of memory banks so that the pixel data which is the component of said image data is stored in said plurality of memory banks in a predetermined pixel block unit, and
said pixel data which is the component of said pixel block is stored in a memory cell on one word line of said selected memory bank,
all said pixel data arranged in the vertical direction which are components of said pixel block are read out simultaneously from said memory bank.

20. A read out method as claimed in claim 19, wherein:
the number of pixels in the vertical direction or horizontal direction which are components of said image data of one image is represented by a or b,
the number of pixels which can be stored in one said memory bank is represented by c,
the number of pixels which can be stored in a memory cell on one word line of said memory bank is represented by d,
the number of pixels which can be read out simultaneously by said memory bank is represented by e, and
the number of pixels selected from the image data read out from two or more memory banks out of said plurality of memory banks is represented by f,
said memory means has said memory banks of the number h represented by the equation:

$$h = F(a \times b/c) + 2,$$

wherein F(x) represents the minimum even number equal to or larger than x,
said pixel block consists of e pixels in the vertical direction and the number of pixels equal to the maximum integer equal to or smaller than d/e in the horizontal direction, and
said read out selecting means selects memory banks of the number equal to the minimum integer i equal to or larger than (f/e−1) from said plurality of memory banks and reads out said pixel data.

21. A read out method as claimed in claim 20, wherein in the case that one memory bank is selected from among said plurality of memory banks to store said image data so that said pixel blocks positioned adjacent each other in the horizontal direction on said image data are stored in two said memory banks alternately and said pixel blocks adjacent each other in the vertical direction on said image data are stored in h/2 said memory banks periodically,
the number i of said memory banks selected from among said plurality of memory banks is (h/2−1) or less.

* * * * *

UNITED STATES PATENT AND TRADEMARK OFFICE
CERTIFICATE OF CORRECTION

PATENT NO. : 6,181,632 B1  Page 1 of 1
APPLICATION NO. : 09/394439
DATED : January 30, 2001
INVENTOR(S) : Kondo et al.

It is certified that error appears in the above-identified patent and that said Letters Patent is hereby corrected as shown below:

Column 6, lines 66, 67:  change  "pixel sector 104(?5)" to --pixel selector 104--

Column 8, line 12:  change  " right (?2, left?) adjacent" to --right adjacent--

Column 8, lines 67, Column 9, line 1:
  change  "right (?2, left?) adjacent" to --right adjacent--

Column 9, line 23:  change  "B10 to B13(?3) similiarly" to --B10 to B13 similarly--

Column 14, line 6:  change  "selector 104(?4) shown " to --selector 104 shown--

Signed and Sealed this

First Day of August, 2006

JON W. DUDAS
*Director of the United States Patent and Trademark Office*